Sept. 11, 1928.
J. F. MORRIS
1,683,911
WATER SUPPLY FOR AUTOMOBILE RADIATORS
Filed March 25, 1926
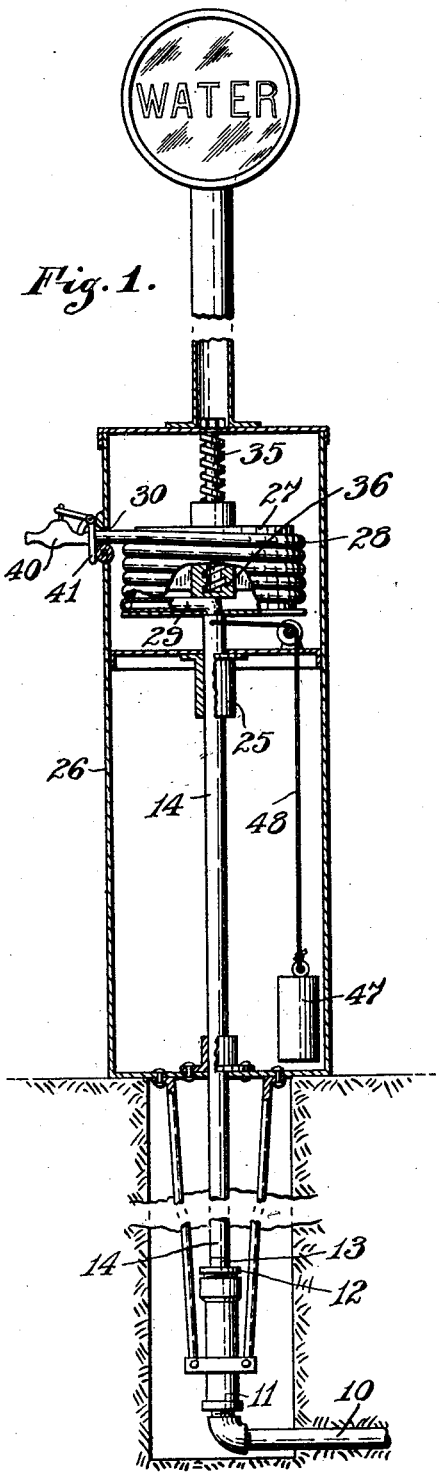
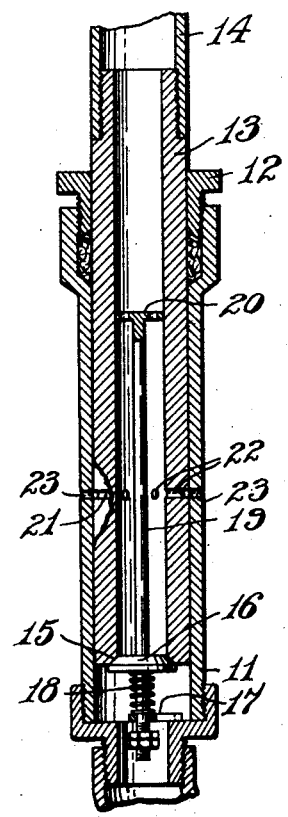
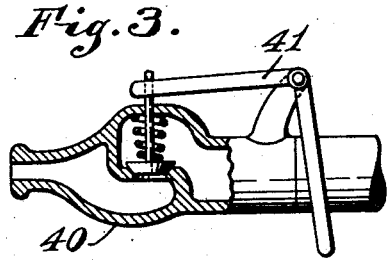
INVENTOR.
Joseph F. Morris,
BY
Hood + Hahn.
ATTORNEYS Patented Sept. 11, 1928.

1,683,911

UNITED STATES PATENT OFFICE.

JOSEPH F. MORRIS, OF WEST LAFAYETTE, INDIANA.

WATER SUPPLY FOR AUTOMOBILE RADIATORS.

Application filed March 25, 1926. Serial No. 97,214.

The object of my invention is to produce a device for dispensing water, which can be erected out of doors at a point convenient to access by automobile drivers, the construction being such that the above ground conduits will be automatically drained after each use so as to obviate danger of injury by freezing.

The accompanying drawings illustrate my invention.

Fig. 1 is a vertical section of an embodiment of my invention;

Fig. 2 is an enlarged vertical section of the lower valve structure, and

Fig. 3 is an enlarged sectional detail of a convenient form of valve nozzle.

In the drawings 10 indicates a below-ground supply pipe to which is secured, at a point below normal freezing levels, a vertically arranged cylinder 11 provided with a packing gland 12 at its upper end. Mounted within the cylinder 11 is a valve-seat tube 13 which is projected through the packing gland and formed at its upper end for connection to a pipe 14. The lower end of tube 13 is formed into a valve seat 15 adapted to co-operate with a valve reciprocably mounted within a support 17 mounted in the lower end of the cylinder, a spring 18 being provided to normally urge the valve 16 to the upper limit of its movement. The valve 16 may be supported within cylinder 11 in any desired manner and a convenient way is to provide it with a stem 19 which projects upwardly into the bore of tube 13 and is centralized by a spider 20. Formed in the circumference of tube 13 at a point always within cylinder 11 is an annular groove 21 which communicates with the bore of tube 13 through one or more passages 22. Registering with the lowest position of groove 21 is a drain passage 23 formed through the wall of cylinder 11. The upper end of pipe 14 is vertically reciprocable through a bearing 25 in a housing 26 and secured to the upper end of said pipe is a winding drum 27 upon which is wound a flexible hose 28, the inner end of said hose connecting with the upper end of pipe 14 by means of a radial pipe 29, and the upper or outer end of said hose being projected through an opening 30 in the housing. Mounted in the housing is a vertical threaded stem 35 threaded into an axial nut 36 carried by the drum, the pitch of the thread being substantially the same as the pitch of the hose on the drum, the arrangement being such that, as the hose is drawn outwardly the drum will rise so as to keep the remaining portion of the hose in substantial alignment with the opening 30 and so as to draw the valve seat 15 away from valve 16. It will be readily understood that the pitch of screw 35 need only be sufficient to cause the necessary movement of valve seat 15 relative to valve 16 but that it is more convenient to have the pitch substantially correspond with the pitch of the hose on the drum.

Secured to the outer end of the hose is a delivery nozzle 40 which is preferably of the self-closing type and provided with an operating lever 41 which, when the hose is fully retracted, will engage the housing and operate to open the valve in the nozzle.

In order to insure the automatic opening of the nozzle valve a counter-weight 47 may be mounted within the housing and connected to the drum by a cable 48 in such manner as to rotate the drum to wind the hose up.

In operation the drain passages 22 and 23 are normally in registry and the valve of the nozzle is open so that all liquid above the level of the drain passages 22 will be drained out.

When the nozzle is grasped and the hose drawn outwardly from the housing, valve seat 15 will be drawn upwardly and, as soon as further movement of valve 16 is prevented, will be drawn away from the valve so as to permit a flow of water from the supply pipe upwardly into pipe 14 and hose 28. When the nozzle is released the counter-weight will cause a reverse rotation of the drum and consequent retraction of the hose and when lever 41 engages the housing the valve of the nozzle will be withdrawn from its seat so as to permit air to flow into the nozzle and consequently permit the water within the hose and pipe 14 to drain downwardly through the drainage passages 22 and 23.

I claim as my invention:

1. A liquid dispensing apparatus comprising a supply pipe, a flexible delivery pipe, a drum upon which said flexible pipe is wound, a rotating connection between the supply pipe and delivery pipe to permit rotation of the drum, means dependent upon drum rotation for controlling liquid delivery to the flexible delivery pipe, means for draining said supply pipe controlled by the rotation of said drum and means dependent upon drum rotation for controlling the reverse outflow from the flexible delivery pipe said means comprising a normally closed delivery nozzle and means for automatically opening said delivery nozzle when the drainage means is in active position.

2. A liquid dispensing device comprising a valve cylinder having a yieldable valve mounted therein, a valve-seat tube reciprocably mounted in said cylinder and co-operating with the yieldable valve thereof, a rotatably mounted drum arranged by its rotation to reciprocate said valve seat tube, a delivery tube wound on said drum, connected with said valve-seat tube and having a delivery end movable toward and from a normal position, means dependent upon movement of said delivery end from and toward normal position to move the valve-seat tube from and toward its valve.

3. A liquid dispensing device comprising a valve cylinder, a valve-seat tube reciprocably mounted in said cylinder and co-operating with the valve thereof, a delivery tube connected with said valve-seat tube and having a delivery end movable toward and from a normal retracted position, means dependent upon movement of said delivery end from and toward normal position to move the valve-seat tube from and toward its valve, a valved delivery nozzle on the delivery tube, means for automatically opening said delivery nozzle valve when the delivery end of the delivery pipe is in its normal retracted position, and drainage passages in effective drainage relationship when the delivery end of the delivery tube is in normal retracted position.

4. A water dispensing apparatus comprising a valve cylinder provided with a spring supported valve, a valve-seat tube axially reciprocable in said cylinder and co-operating with said valve, a winding drum connected to said valve-seat tube to cause rotation thereof, means co-acting with said drum to cause axial movement of the tube by rotation of the drum, means to cause reverse rotation of the drum, a flexible delivery pipe mounted on the drum and connected with the tube and drainage means for said valve seat tube controlled by the reciprocating movement of said tube.

5. A water dispensing apparatus comprising a valve cylinder provided with a spring supported valve, a valve-seat tube axially reciprocable in said cylinder and co-operating with said valve, a winding drum connected to said valve-seat tube to cause rotation thereof, means co-acting with said drum to cause axial movement of the tube by rotation of the drum, means to cause reverse rotation of the drum, a flexible delivery pipe mounted on the drum and connected with the tube, drainage passages in effective registry when the valve and tube are related to prevent fluid delivery, a valved discharge nozzle for the delivery pipe, and means by which the valve of said nozzle is opened when the drainage passages are in effective registry.

In witness whereof, I have hereunto set my hand at West Lafayette, Indiana, this 22nd day of March, A. D. one thousand nine hundred and twenty six.

JOSEPH F. MORRIS.